(12) United States Patent
Chen et al.

(10) Patent No.: US 7,443,663 B2
(45) Date of Patent: Oct. 28, 2008

(54) COMPUTER ENCLOSURE WITH PIVOTABLE BRACKET

(75) Inventors: Yun-Lung Chen, Shenzhen (CN);
Wen-Yu Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 330 days.

(21) Appl. No.: 11/306,460

(22) Filed: Dec. 29, 2005

(65) Prior Publication Data

US 2007/0153467 A1    Jul. 5, 2007

(51) Int. Cl.
*G06F 1/16* (2006.01)
(52) U.S. Cl. .................. 361/683; 160/300; 248/259; 720/623
(58) Field of Classification Search ................ 248/129, 248/259, 547; 160/122, 295, 300; 347/171, 347/222; 720/622, 623, 692; 361/679–687, 361/724–727
See application file for complete search history.

(56) References Cited

U.S. PATENT DOCUMENTS

| 6,538,879 | B2 |   | 3/2003 | Jiang ......................... 361/683 |
| 6,603,655 | B2 | * | 8/2003 | Hrehor et al. ............... 361/683 |
| 2006/0279918 | A1 | * | 12/2006 | Shi et al. .................... 361/683 |
| 2007/0153469 | A1 | * | 7/2007 | Chen et al. .................. 361/685 |

* cited by examiner

*Primary Examiner*—Hung V Duong
(74) *Attorney, Agent, or Firm*—Wei Te Chung (57) ABSTRACT

A computer enclosure includes a chassis (20), and a bracket (10) pivotably attached to the chassis. The chassis includes a front plate (27). A first pivot portion (271) is formed along an edge of the front plate. A cutout (272) is defined adjacent the pivot portion along the edge thereof. The bracket forms a second pivot portion (121) thereon. The second pivot portion inserts through the cutout to slide on along the edge of the front plate, thereby the second pivot portion engaging with the first pivot portion.

19 Claims, 9 Drawing Sheets

COMPUTER ENCLOSURE WITH PIVOTABLE BRACKET

FIELD OF THE INVENTION

The present invention relates to computer enclosures, and more particularly to a computer enclosure with a pivotable bracket for accommodating data storage devices such as hard disk drives, floppy disk drives, Compact Disk Read-Only Memory (CD-ROM) drives, etc.

DESCRIPTION OF RELATED ART

Generally, a computer enclosure includes a bracket for accommodating data storage devices such as hard disk drives, floppy disk drives, CD-ROM drives, etc. The bracket is often secured to the computer enclosure with screws. However, this mounting means can be very inconvenient, laborious, and time-consuming.

Another kind of computer enclosure includes a frame body, a first bracket, a second bracket, a slide structure, and a retaining device. The first and second brackets are used to accommodate the data storage devices. The first bracket is fixedly locked in the frame body. The second bracket is pivotally joined on the frame body. Through sliding of the slide structure, the second bracket can be turned over to facilitate assembly or disassembly for a computer maintenance technician. Contrarily, the second bracket can reach a predetermined position to let the second bracket be hooked on the first bracket through retaining of the retaining device, thereby achieving the object of positioning. However, this mounting means for securing the second bracket to the first bracket is rather complicated.

What is needed, therefore, is a computer enclosure having a bracket which is conveniently secured to the mounting enclosure with a simple mounting means.

SUMMARY OF INVENTION

A computer enclosure includes a chassis, and a bracket pivotably attached to the chassis. The chassis includes a front plate. A first pivot portion is formed along an edge of the front plate. A cutout is defined adjacent the pivot portion along the edge thereof. The bracket forms a second pivot portion thereon. The second pivot portion inserts through the cutout to slide on along the edge of the front plate, thereby the second pivot portion engaging with the first pivot portion.

Other advantages and novel features will be drawn from the following detailed description of preferred embodiments with attached drawings, in which:

DETAILED DESCRIPTION

Figure 1:
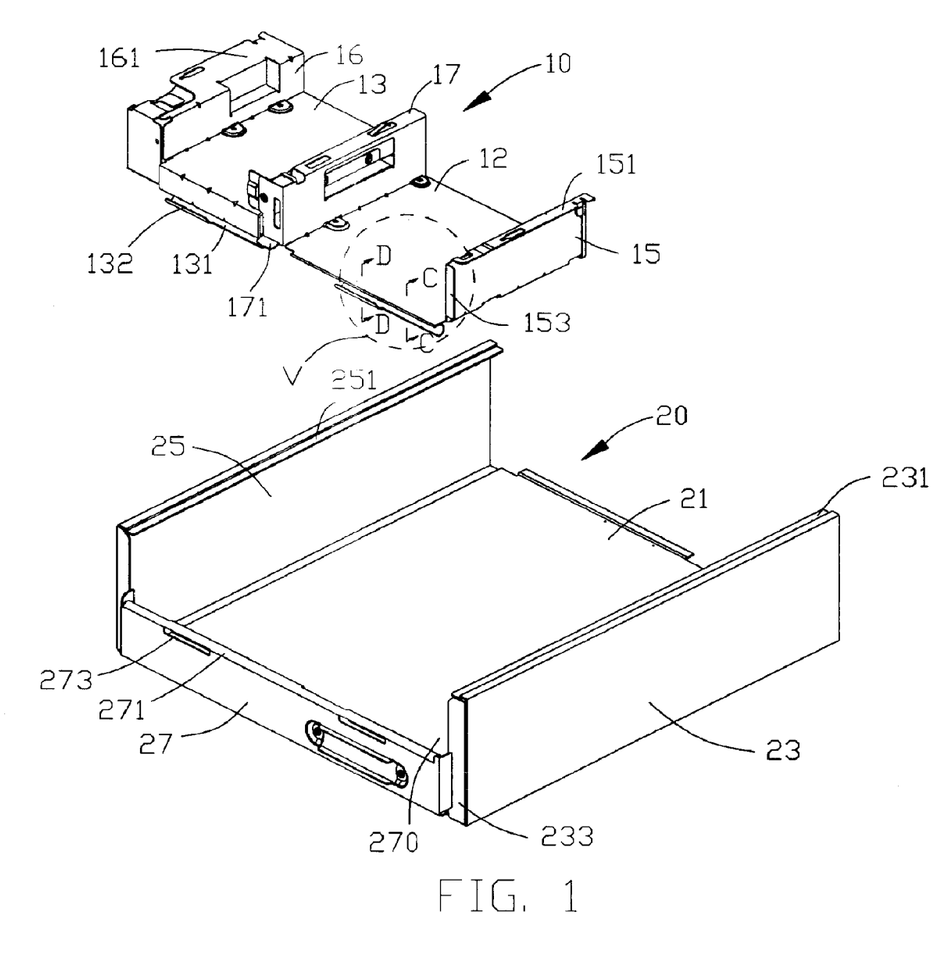
FIG. 1 is an exploded, isometric view of a computer enclosure of a preferred embodiment of the present invention, the computer enclosure including a chassis, and a bracket.

Referring to FIG. 1, a computer enclosure includes a chassis 20, and a bracket 10 used to accommodate data storage devices. The data storage devices may, for example, be hard disk drives, floppy disk drives, CD-ROM drives, etc.

Figure 2:
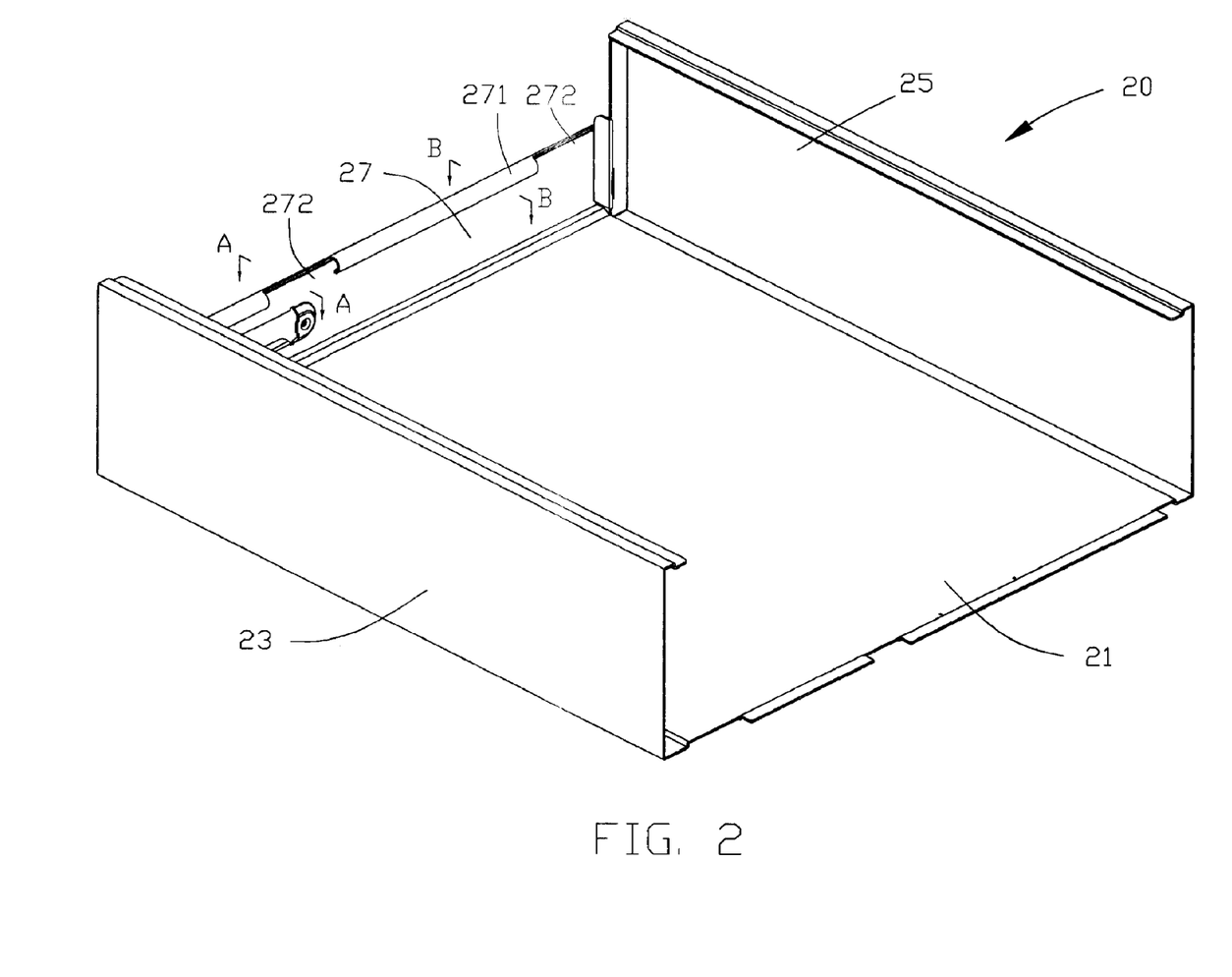
FIG. 2 is an enlarged, isometric view of the chassis of FIG. 1, but viewed from another aspect.
Figure 3:
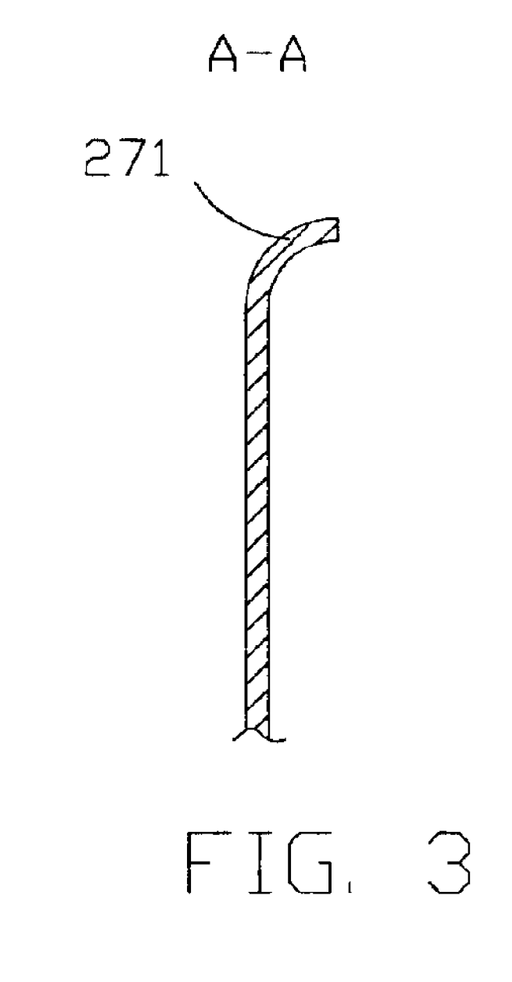
FIG. 3 is a cross-section view of direction A-A the chassis of FIG. 2.
Figure 4:
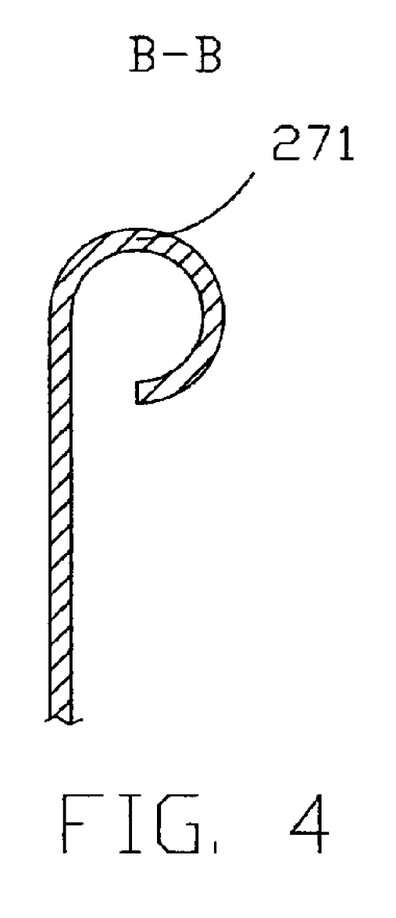
FIG. 4 is a cross-section view of direction B-B of the chassis of FIG. 2.

Referring also to FIGS. 2 to 4, the chassis 20 includes a bottom plate 21, a front plate 27, and a pair of side plates 23, 25. The front plate 27 and the side plates 23, 25 are perpendicularly bent from adjacent edges of the bottom plate 21 respectively. The front plate 27 has a smaller height than the side plates 23, 25, and defines an opening 270 therein. A first pivot portion 271 is formed at a bottom edge of the opening 270 by rolling inward and downward. The first pivot portion 271 has an arc-shaped cross-section. Two spaced cutouts 272 are defined in the first pivot portion 271, as best shown in FIG. 2. The front plate 27 defines two through slots 273 therein near the cutouts 272 respectively. Support flanges 231, 251 are inward bent from a top edge of each side plate 23, 25 respectively. A blocking flange 233 is inward bent from a front edge of the side plate 23.

Figure 5:
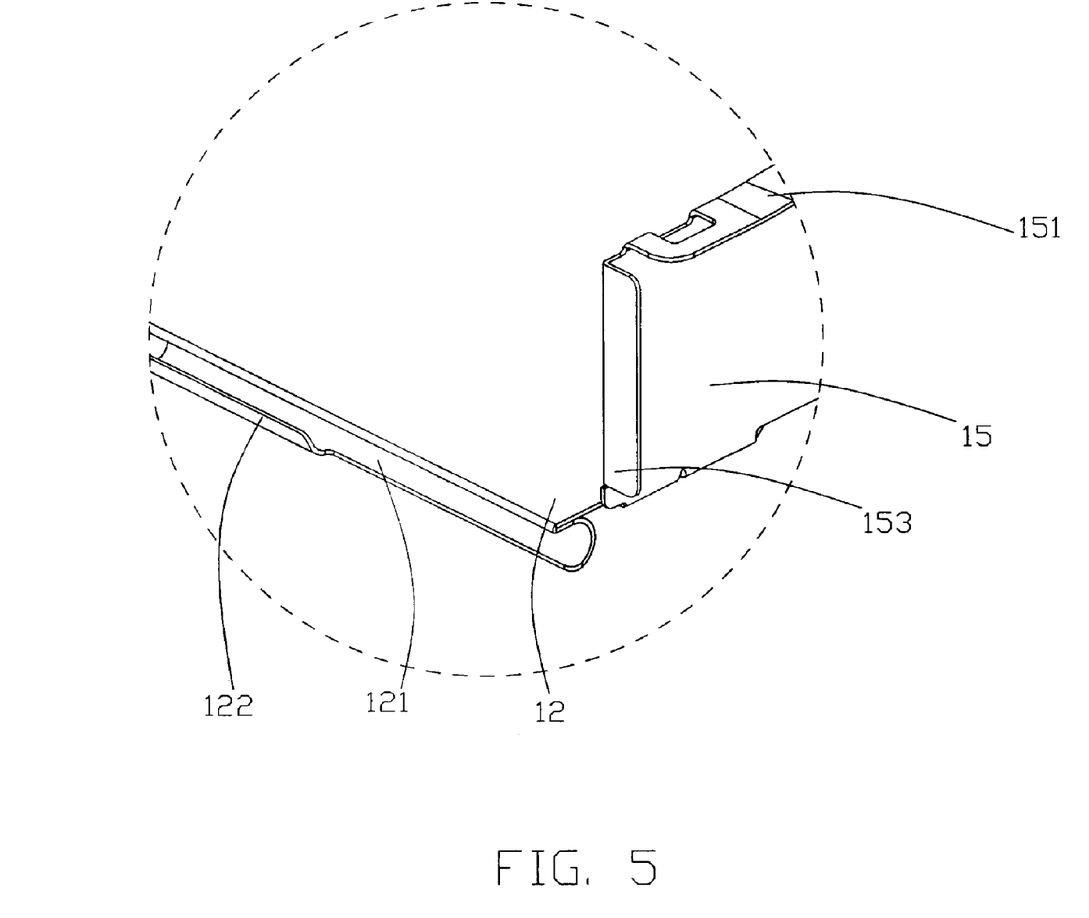
FIG. 5 is an enlarged view of a circled portion V of the bracket of FIG. 1.
Figure 6:
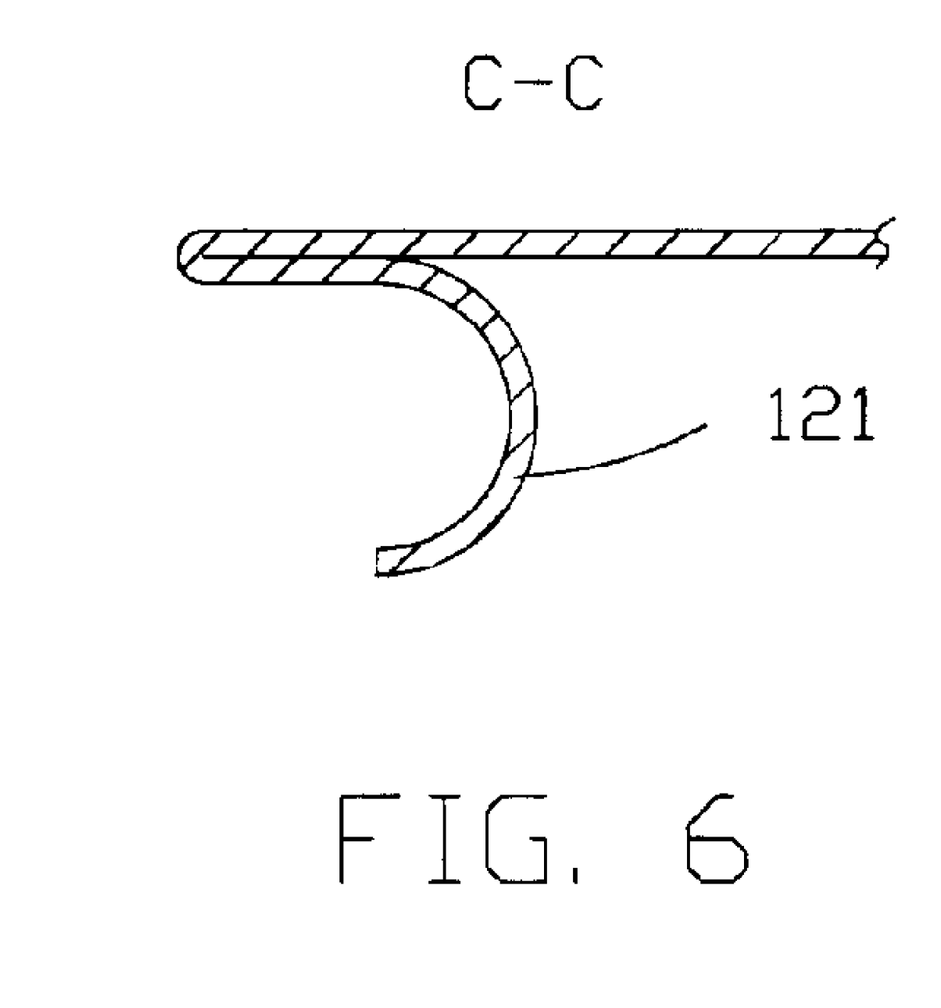
FIG. 6 is a cross-section view of direction C-C of the bracket of FIG. 1.
Figure 7:
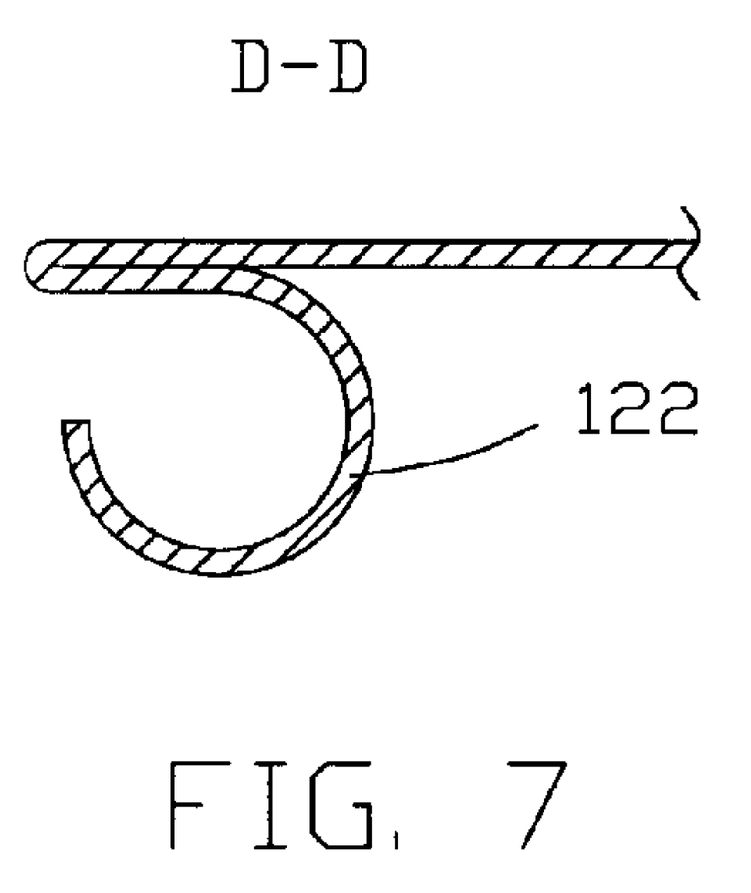
FIG. 7 is a cross-section view of direction D-D of the bracket of FIG. 1.

Referring also to FIGS. 5 to 7, the bracket 10 includes two bottom walls 12, 13, and a pair of side walls 15, 16. A projecting portion 17 is formed on the bracket 10 connecting with the bottom walls 12, 13. Two second pivot portions 121, 131 are formed at front edges of the bottom walls 12, 13 respectively by rolling outward and downward, for receiving the first pivot portion 271 of the chassis 20. The second pivot portions 121, 131 have an arc-shaped cross-section. Each second pivot portion 121, 131 has a securing portion 122, 132 respectively. The length of the arcs of the securing portions 122, 132 are greater than the length of the arcs of the remaining parts of the second pivot portions 121, 131. Two retaining flanges 151, 161 extend outwardly from the side walls 15, 16. A positioning flange 153 extends out from a front edge of the side wall 15, corresponding to the blocking flange 233 of the side plate 23 of the chassis 20. A positioning clip 171 extends from a front end of the projecting portion 17.

Figure 8:
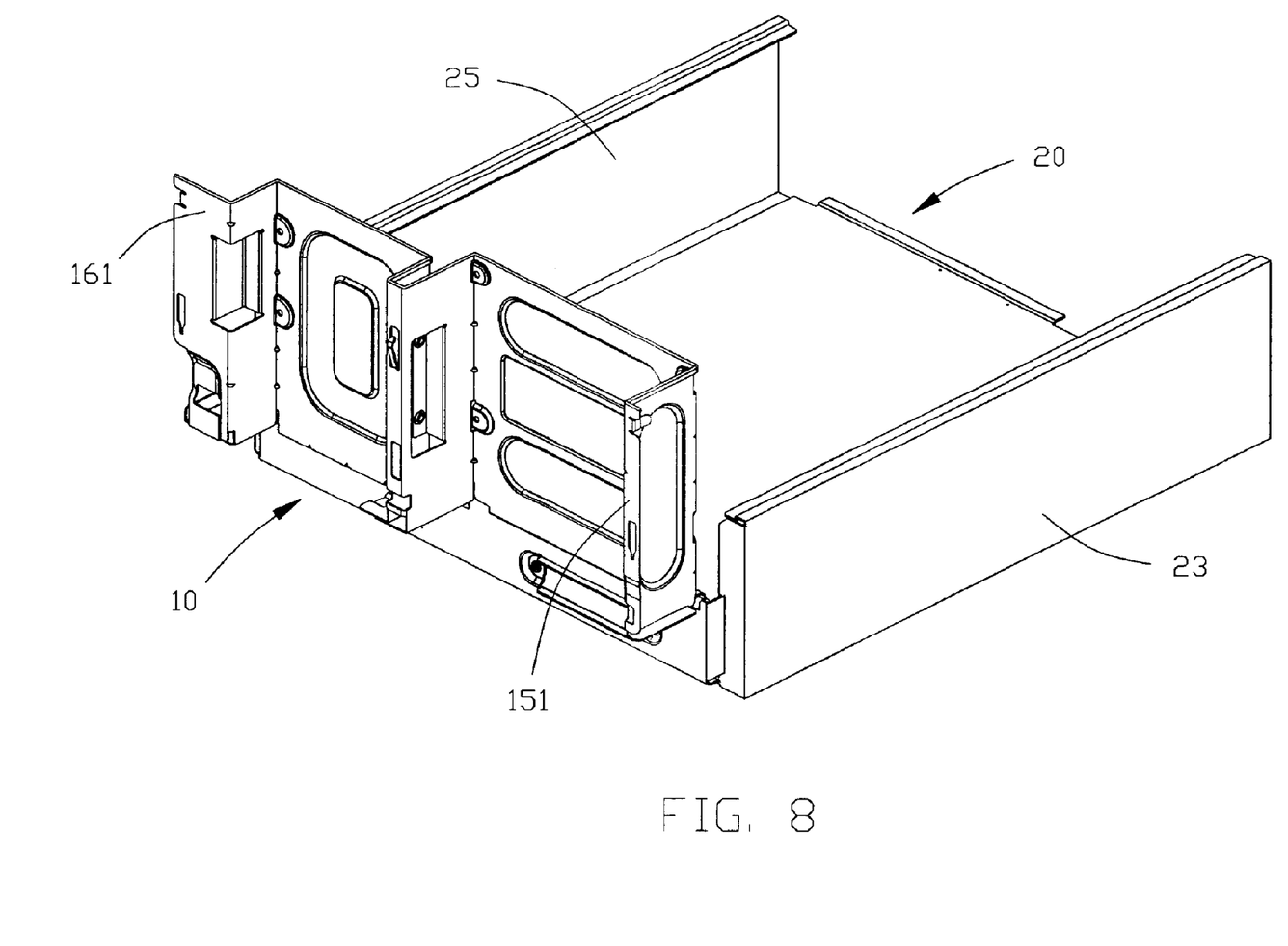
FIG. 8 is an assembled view of the computer enclosure of FIG. 1, and showing the bracket in a vertical position.

Referring also to FIG. 8, in assembly, the bracket 10 is placed in a vertical position. The securing portions 122, 132 of the second pivot portion 121, 131 of the bracket 10 align with the cutouts 272 of the first pivot portion 271 of the chassis 20. The bracket 10 is then lowered into the opening 270 of the chassis 20. The securing portions 122, 132 insert through the corresponding cutouts 272. The bracket 10 can then be pushed to slide towards the side plate 23 along the axle of the first pivot portion 271 (or an extending direction of the top edge of the first plate 27), until the side wall 15 of the bracket 10 is blocked by the support flange 231 of the side plate 23 of the chassis 20. The second pivot portions 122, 132 pivotably sleeves around the first pivot portion 271. The positioning clip 171 abuts against the front plate 27 of the chassis 20, thereby the second pivot portions 121, 131 of the bracket 10 holding the first pivot portion 271 to the chassis 20. The bracket 10 is thus pivoted to the chassis 20.

Figure 9:
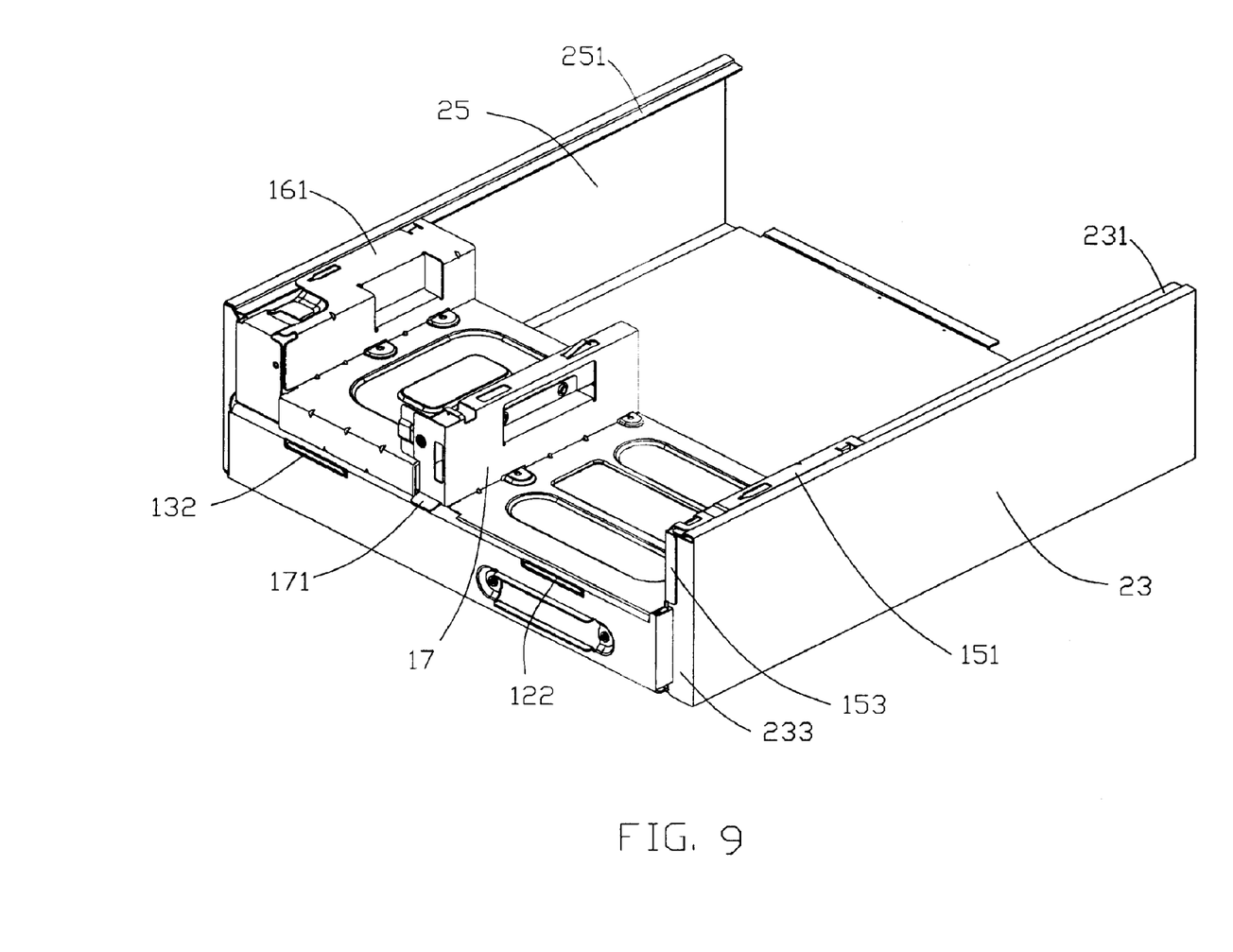
FIG. 9 is similar to FIG. 8, but showing the bracket rotated down to a horizontal position.

Referring also to FIG. 9, the bracket 10 is then rotated down. When the retaining flanges 151, 161 of the bracket 10 rest on the support flanges 231, 251 of the side plates 23, 25, the securing portions 122, 132 are received by the corresponding through slots 273 of the front plate 27. The positioning flange 153 of the bracket 10 abuts against the blocking flange 233. The bracket 10 is in a horizontal position.

In disassembling the bracket 10, the bracket 10 is rotated up to the vertical position. The securing portions 122, 132 disengage from the through slots 273. The bracket 10 can be thus slid towards the side plate 25. When the securing portions 122, 132 of the second pivot portion 121, 131 align with the corresponding cutouts 272 again, the bracket 10 is then removed from the chassis 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a chassis having a first pivot portion, the first pivot portion having an arc-shaped cross-section; and
   a bracket attached to the chassis, the bracket having a second pivot portion pivotably engaging with the first pivot portion, the second pivot portion also having an arc-shaped cross-section;
   wherein the second pivot portion of the bracket forms a securing portion thereon, and the chassis defines a cutout therein, the securing portion inserts through the cutout and can thus slide on the first pivot portion.

2. The computer enclosure as described in claim 1, wherein the length of the arc of the securing portion is greater than the length of the arc of the remaining part of the second pivot portion of the bracket.

3. The computer enclosure as described in claim 1, wherein the chassis defines a through slot therein, when the bracket is rotated down to rest on the chassis, the securing portion is received by the through slot.

4. The computer enclosure as described in claim 3, wherein the chassis comprises a front plate, and the front plate defines an opening for receiving the bracket therein.

5. The computer enclosure as described in claim 4, wherein the first pivot portion is formed along an edge of the front plate, and the through slot is defined in the front plate.

6. The computer enclosure as described in claim 4, wherein a positioning clip extends from the bracket to abut against the front plate of the chassis, thereby the second pivot portion of the bracket holding the first pivot portion to the chassis.

7. A computer enclosure, comprising:
   a chassis comprising a front plate, a first pivot portion being formed along an edge of the front plate, a cutout being defined adjacent the pivot portion along the edge thereof; and
   a bracket pivotably attached to the chassis, the bracket forming a second pivot portion thereon, the second pivot portion inserting through the cutout to slide along the edge of the front plate, thereby the second pivot portion engaging with the first pivot portion.

8. The computer enclosure as described in claim 7, wherein the front plate defines an opening for accommodating the bracket therein.

9. The computer enclosure as described in claim 7, wherein a positioning clip extends from the bracket to abut against the front plate, thereby the second pivot portion further tightly engaging with the first pivot portion.

10. The computer enclosure as described in claim 7, wherein the first pivot portion has an arc-shaped cross-section, and the second pivot portion also has an arc-shaped cross-section.

11. The computer enclosure as described in claim 10, wherein the second pivot portion of the bracket forms a securing portion thereon, corresponding to the cutout of the first pivot portion.

12. The computer enclosure as described in claim 11, wherein the length of the arc of the securing portion is greater than the length of the arc of the remaining part of the second pivot portion of the bracket.

13. The computer enclosure as described in claim 11, wherein the front plate defines a through slot for receiving the securing portion thereinto when the bracket is rotated down to rest on the chassis.

14. An enclosure for a computer, the enclosure comprising:
    a chassis comprising a first plate forming a first rolled portion thereon; and
    a bracket configured for receiving a data storage device therein, the bracket forming a second rolled portion pivotably sleeving the first rolled portion.

15. The enclosure of claim 14, wherein the chassis comprises a bottom plate, a pair of second plates extending from two opposite edges of the bottom plate, the first plate extending from one edge of the bottom plate that connects the opposite edges thereof, and the first plate has a smaller height than the second plates.

16. The enclosure of claim 15, wherein the first rolled portion is formed by rolling inward and downward a top edge portion of the first plate.

17. The enclosure of claim 16, wherein the first plate defines a through slot therein below the first rolled portion, the second rolled portion comprises a securing section that has a greater rolled length than the remaining section of the second rolled portion, the securing section engaged in the through slot to secure the bracket in position and being disengageable from the through slot upon pivoting the bracket up.

18. The enclosure of claim 17, wherein the first rolled portion defines a cutout therein adjacent the through slot, the cutout being configured such that the securing section is able to enter the cutout and slide to the through slot along an extending direction of the top edge of the first plate.

19. The enclosure of claim 15, wherein the bracket comprises a pair of sidewalls each forming a support flange, and the support flanges are supported an top edges of the second plates of the chassis, respectively.

* * * * *